May 27, 1952     D. ROSENTHAL ET AL     2,598,019
DISPLAY DEVICE
Filed April 27, 1949
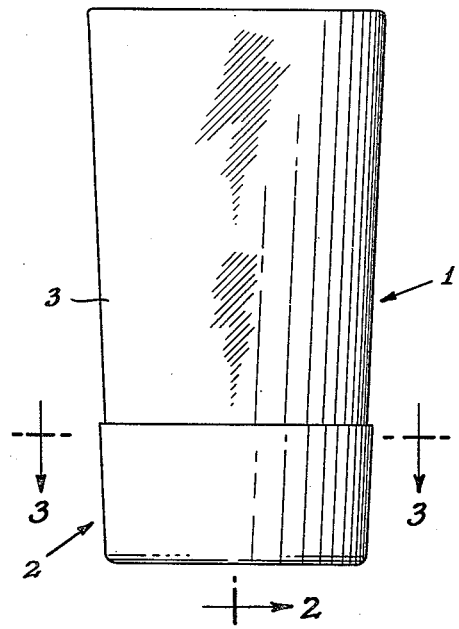
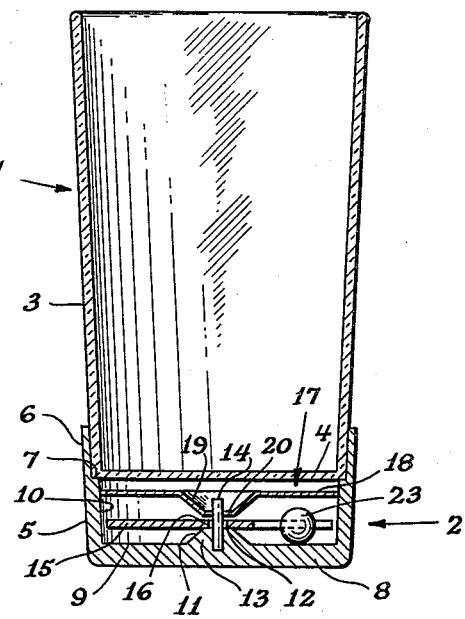
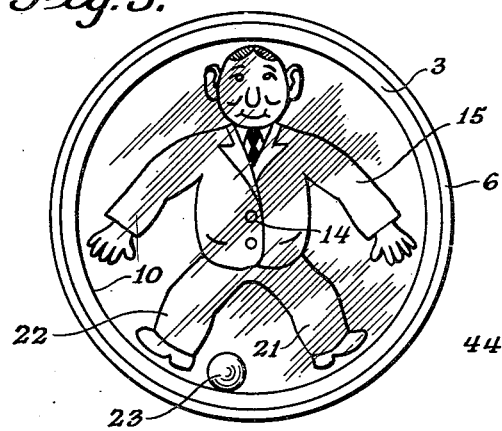
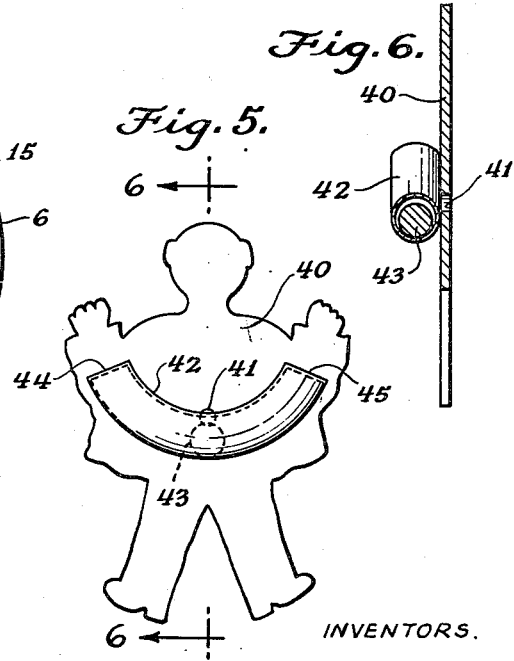
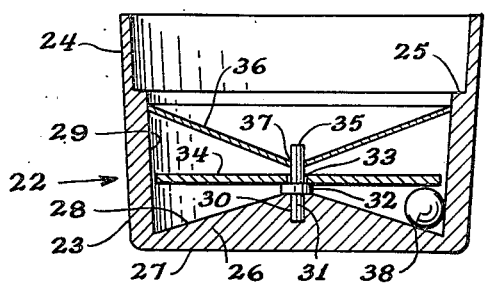
INVENTORS.
DANIEL ROSENTHAL
RICHARD W. ADLER and
JEROME NATHAN
BY
ATTORNEY.

Patented May 27, 1952

2,598,019

UNITED STATES PATENT OFFICE 2,598,019

DISPLAY DEVICE

Daniel Rosenthal, Brooklyn, and Richard W. Adler, New York, N. Y., and Jerome Nathan, Ridgefield, N. J.; said Adler and said Nathan assignors to said Rosenthal Application April 27, 1949, Serial No. 89,862

7 Claims. (Cl. 46—116)

This invention relates to display devices and more particularly to instrumentalities and mountings therefore to provide animated displays in conjunction with and visible through the bottom of a drinking vessel.

The principal object of this invention is to provide gravity actuated animated displays in a simple and economical manner, which displays are intended to be viewed through the transparent bases of drinking vessels.

Another object is to provide such displays which will be animated in response to any movement of the display holder.

Still another object is to provide such animated displays in which the animation thereof will be prolonged.

Another object is to provide such displays which are simple in construction and reliable in operation.

A further object is to provide such displays which will quickly adopt a generally upright position, but will continue reasonable animation from that position.

Still further objects are to provide such displays out of simple elements which are readily formed and thoroughly effective.

Further objects will be apparent as the description of the invention, taken in conjunction with the accompanying drawing proceeds.

Figure 1 is an elevation of a drinking vessel with a base applied thereto in accordance with the invention.

Figure 2 is a vertical section taken on lines 2—2 of Figure 1.

Figure 3 is a horizontal section taken on lines 3—3 of Figure 1 and looking in the direction of the arrows.

Figure 4 is a vertical half section of a modified form of base.

Figure 5 is a rear elevation of a modified form of display figure.

Figure 6 is a vertical section taken on lines 6—6 of Figure 5 looking in the direction of the arrows.

In the drawing just referred to and in the detailed description thereof to follow, the display device of the invention is shown and described as applied to a drinking glass formed with a transparent bottom. It is, of course, to be understood that this showing and description are for illustrative purposes only, as is the use of the name "drinking glass" used herein and hereinafter. The receptacle referred to as a "drinking glass" might be any receptacle capable of containing any food product, or beverage, or might merely be a display vessel, it merely being necessary that such receptacle or vessel have a transparent bottom through which the display presented by the device applied to that bottom could be viewed.

Referring to the drawing in detail, the drinking glass is generally indicated at 1, and the display device at 2. The drinking glass 1 may be formed of any suitable material with a side wall 3 and a transparent bottom 4. The side wall 3 would preferably be straight, though some stepped form, to conform to a particular display device configuration, might also be employed.

The drinking glass 1 is, as shown, received by the display device 2, which latter is generally cup-shaped and has a side wall 5 whose reduced upper portion 6 is so dimensioned as to snugly receive the lower portion of the side wall 3 of the drinking glass. The side wall 5 is inset at 7 to form an annular shoulder on which the perimeter of the bottom 4 seats when the drinking glass and display device are properly assembled.

The display device 2 may be formed of any suitable material, though from the economic standpoint materials such as the plastics or metals which can be formed in moulds, or cast, are preferred. The illustration shown in the accompanying drawing is that of a plastic material.

In the preferred form of display device, shown in Figure 4, the outside of the bottom 8 thereof is so formed that the device, and the drinking glass retained by it, will stand in a normal upright position. The inside of the bottom 8 has an annular flat surface 9 extending inward a substantial distance from its juncture with the inner surface 10 of the side wall 5. At its inner edge, the surface 9 terminates in an upwardly inclined surface 11 in the form of a truncated cone centered about the center line of the bottom 8 and terminating at its top in the flat bearing surface 12. This cone shaped portion 13 is centrally recessed to receive and retain a pivot pin 14, a portion of which is received in the cone 13, but the majority of which extends up above the same.

A display figure 15 is received within the confines of the surfaces 9, 10 and 11 and is pivotally mounted at 16 on the pivot pin 14, with a portion of its under surface surrounding the pivotal mounting 16 seated on the bearing surface 12. The chamber in which the figure 15 is mounted is closed on its upper side by a suitable transparent element 17, which, like the bottom 8, has an annular portion 18 in opposition to the surface 9 and has a downwardly extending conical portion 19 concentric with respect to the center of the base 2. The conical portion 19 terminates in a flat portion 20 suitably pierced to receive and retain the upward extension of the pivot pin 14 in a tight joint so that no foreign matter can find its way into the chamber occupied by the figure 15.

The display figure 15, here illustrated as a caricature of a human being, may of course be of any suitable configuration to provide the type of display desired. The only criterion to be met is that it have a pair of downwardly extending extremities, or other suitable opposed portions, such as the legs 21 and 22, in order to confine therebetween an actuating element capable of rolling back and forth, such as the ball 23. In this form the ball 23 is confined above and below by the surfaces 7 and 18 at the outermost position by the side wall 10, and from one side to the other by the legs 21 and 22. Thus, all the ball can do is travel back and forth between the legs 21 and 22.

The figure 15 may have its legs 21 weighted, if desired, but this is not necessary. The element 23 being a ball or other rolling element of substantial weight, such as a ball or roller bearing, will, of course, tend to drop to the lowermost position in its confined path and, accordingly, as soon as the glass is tilted, will move the figure into a generally upright position. Since it is unlikely that anyone will hold the glass steady enough to preclude all motion of the ball 23, the same will not come to an immediate standstill, and in its rolling back and forth it will hit the legs 21 and 22 and continue to give the figure 15 a reasonable animation while the glass is held in hand.

In the alternative form shown in Figure 4, the base 22 has a side wall 23, a reduced upwardly extending portion 24 and an annular seat 25. The bottom 26 has an outer seating surface 27 and its inner surface 28 is inclined upwardly like the surface of a flat cone all the way from the inner surface 29 of the wall 23 to a center bore 30. The bore 30 receives a pivot pin 31, here shown as formed with a collar 32 seated upon the upper extension of the surface 28. The collar 32 has an upper seating surface 33 for the reception of a display element 34 pivoted on the upwardly extending portion 35 of the pin 31.

To form an enclosed chamber for the mounting of the element 34, an upper element 36 is provided, comparable to the element 17 of the Figure 2 form except that the element 36 extends in a continuous conical surface, substantially the reverse of the surface 28. The element 36 receives and mounts the extending portion 35 of the pin 31 at the center portion 37, and this, like the reception of the pin 14 by the portion 20, should be a tight joint so that no foreign matter may find its way into the chamber in which the display element operates.

In the Figure 4 form, it is apparent that the vertical height of the chamber at the wall 29 is greater than is the case in the Figure 2 form, and, in addition, the impelling ball 38 may be smaller. Thus, it will be apparent that even though the display figure 34 has a pair of extremities like 21 and 22 which may retain the ball, the latter can nevertheless escape from between those extremities rather readily and thus introduces an additional element of interest into the device. In other words, once the ball 38 escapes, the element of skill of the holder comes into play in order to cause it to roll back into a position where it will once more act between the extremities of the figure and cause controlled animation as heretofore described.

An alternate form of display element 40 is shown in Figures 5 and 6. This element 40 is designed to be pivoted about the center position 41, and has an arcuate ball race 42 in the form of a tube secured to the back thereof. The ball race 42 receives an impelling ball 43 which rides freely within the tubular interior of the race. The ends 44 and 45 of the race are suitably closed so that the ball 43 is confined therein. Here the ball, acting only slightly below the center pivot 41, will take a longer time to bring the figure into the general upright position desired and will add to the interest, inasmuch as the race is mounted on the back of the element where it is obscured from view. Speculation will thus be caused as to what creates the animation. Obviously, some modified form of chamber may be necessary for the proper reception of this figure, but the chamber conformations heretofore described will suggest a suitable construction to one skilled in the art.

From the foregoing it will be apparent that this invention provides a simple and practical manner of furnishing animated displays, whether to gain the attention of children, or attract older persons for one reason or another. Certain modifications in such structure will suggest themselves to those skilled in the art, without however departing from the spirit or scope of the invention. It is, accordingly, to be understood that the foregoing is to be taken purely in the illustrative and not in a limiting sense, with the only limitation on the scope of the invention being such as may be imposed thereon by the teachings of the prior art.

Having disclosed our invention, what we claim as new and desire to secure by Letters Patent is:

1. In a device of the character described, a mounting member including a base portion and a receiving portion, said receiving portion being formed to receive a drinking glass therein, said base portion being formed with a bottom and with a transparent cover in spaced relation with respect to said bottom thereby forming a chamber between said bottom and said cover, pivotal mounting means in said chamber and extending from said bottom to said transparent cover, a display element mounted in said chamber on said pivotal mounting means and formed with a pair of extremities extending substantially to the periphery of said chamber, and a roller element confined within said chamber, said roller element being received between said extremities.

2. A display device of the character described comprising a cup-shaped mounting member formed with an upwardly extending pivotal mounting portion on the bottom thereof, a cover element received within said mounting member and formed with a body portion in spaced relation with respect to the bottom of said member and with a pivotal mounting portion extending downward adjacent the pivotal mounting portion of said mounting member, a pivot pin extending between said pivotal mounting portions, a display element pivotally mounted on said pivot pin and extending substantially to the periphery of the inside wall of said mounting member, a ball carried by said mounting member and confined in rollable relation between said bottom of said mounting member and said cover element, and a pair of extremities extending from said element, said ball being received in rollable relation between said extremities.

3. A display device of the character described comprising a cup shaped mounting member, said mounting member including an upstanding side wall formed with a portion for the mounting of a vessel having a transparent bottom, and a base portion, a chamber formed within said side wall and above said base portion, a transparent closing element extending between said side walls in spaced relation to said base portion to close off the upper end of said chamber, a pivot pin extending between said base portion and said closing element, a display element mounted on said pivot pin for pivotal movement within said chamber, said display element being formed with spaced, lateral engaging surfaces and a rollable element between said engaging surfaces, said rollable element being confined between said base portion and said closing element against escape from between said engaging surfaces.

4. A base, including a display device, for the mounting of a vessel having a transparent bottom and for rendering said display device visible through the transparent bottom of said vessel, which comprises, a generally cup shaped member having a bottom portion and an upstanding side wall therearound forming a chamber therewithin above said bottom portion, a display element formed with opposed portions, pivotal mounting means for the pivotal mounting of said display element within said chamber, rollable means within said chamber, said rollable means being received between said opposed portions of said display element, and a transparent member for closing said chamber, said transparent member being located and fixed within said side wall on the remote side of said display element from said bottom portion, whereby on movement of said cup shaped member said rollable member will roll between said portions of said display element and move said element about said pivotal mounting.

5. A base, including a display device, for the mounting of a vessel having a transparent bottom and for rendering said display device visible through the transparent bottom of said vessel which comprises, a generally cup shaped member having a bottom portion and an upstanding wall therearound forming a chamber therewithin above said bottom portion, a transparent membrane closing said chamber and engaged with said side wall in spaced relation with respect to said bottom portion, a display element between said bottom portion and said transparent membrane, pivotal mounting means extending from said bottom portion to and into engagement with and engaging said display element for the pivotal mounting of the same, said display element being formed with spaced opposed portions, a ball bearing of smaller diameter than the distance between said spaced opposed portions and being located therebetween, said ball bearing being restricted against escape in one direction by said spaced opposed portions and in a direction at right angles thereto by said bottom portion and said transparent membrane, whereby on movement of said cup shaped member said rollable member will roll between said spaced opposed portions and move said display element about said pivotal mounting.

6. A base, including a display figure for the mounting of a vessel having a transparent bottom and for rendering said display figure visible through the transparent bottom of said vessel which comprises, a generally cup shaped member having a bottom portion and an upstanding side wall therearound, a transparent membrane extending between said side wall in spaced relation to said bottom portion to form a closed chamber above said bottom portion, a display figure seated within said chamber and extending substantially across said bottom portion at its greatest diameter, pivotal mounting means extending from said bottom portion and engaged with said display figure at substantially the center thereof for the pivotal mounting of the same, said display figure having a pair of spaced extremities extending from one end thereof, a ball bearing seated between said extremities and of smaller diameter than the distance between the same, said bottom portion and said transparent membrane confining said ball bearing within the space between said spaced extremities, whereby on movement of said cup shaped member said ball bearing will roll between said spaced extremities to move said figure about said pivot.

7. In a device of the character described, a mounting member including a base portion and a receiving portion, said receiving portion being formed to receive a drinking vessel therein, said base portion being formed with a circular chamber therein and having a transparent top closing the upper end of said circular chamber, a display element pivotally mounted on said base portion within said chamber and formed with a plurality of divergent extremities extending from spaced portions of said display element and terminating closely adjacent the perimeter of said chamber, and a roller element received within said chamber for engagement with an edge of said display element, said roller element being confined within the upper and lower boundaries of said chamber.

DANIEL ROSENTHAL.
RICHARD W. ADLER.
JEROME NATHAN.

REFERENCES CITED

The following references are of record in the file of this patent:

UNITED STATES PATENTS

| Number | Name | Date |
|---|---|---|
| 617,209 | Watt | Jan. 3, 1899 |
| 740,834 | Fantoni | Oct. 6, 1903 |
| 777,305 | Priestnall | Dec. 13, 1904 |
| 1,542,874 | Hampel | June 23, 1925 |
| 1,646,973 | Moore | Oct. 25, 1927 |
| 2,510,237 | Mahoney | June 6, 1950 |